United States Patent
Guerel et al.

(10) Patent No.: US 10,386,452 B2
(45) Date of Patent: *Aug. 20, 2019

(54) DETERMINING POSITIONS OF TRANSDUCERS FOR RECEIVING AND/OR TRANSMITTING WAVE SIGNALS

(71) Applicant: International Business Machines Corporation, Armonk, NY (US)

(72) Inventors: Nezihe Merve Guerel, Rueschlikon (CH); Paul T. Hurley, Oberrieden (CH); Matthieu M. J. Simeoni, Lausanne (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/859,398

(22) Filed: Dec. 30, 2017

(65) Prior Publication Data

US 2018/0292509 A1  Oct. 11, 2018

Related U.S. Application Data

(63) Continuation of application No. 15/480,702, filed on Apr. 6, 2017.

(51) Int. Cl.
*G01S 5/02* (2010.01)
*G01S 5/18* (2006.01)
(Continued)

(52) U.S. Cl.
CPC .............. *G01S 5/0278* (2013.01); *G01S 5/18* (2013.01); *H04B 7/0617* (2013.01); *H04B 11/00* (2013.01); *H04R 1/00* (2013.01)

(58) Field of Classification Search
CPC ........... G01S 5/0278; G01S 5/18; H04R 1/00; H04B 11/00; H04B 7/0617
See application file for complete search history.

(56) References Cited

U.S. PATENT DOCUMENTS 4,894,795 A * 1/1990 Whitehouse ............ G06E 3/001
                                                      708/801
5,329,286 A * 7/1994 Lammers .............. G01S 7/4052
                                                      342/165
(Continued)

OTHER PUBLICATIONS

Nour El-Din Ismail et al, Design and analysis of a phased-MIMO array antenna with frequency diversity. Progress in Electromagnetics Research Symposium Proceedings, Jul. 6-9, 2015. pp. 1745-1750.

(Continued)

*Primary Examiner* — Mehmood B. Khan
(74) *Attorney, Agent, or Firm* — Daniel P. Morris; Otterstedt, Wallace & Kammer, LLP

(57) ABSTRACT

In a method for determining positions $\{p_i\}_{i=1,\ldots,N}$ of transducers $\{A_i\}_{i=1,\ldots,N}$ of an apparatus, the transducers are assumed to be configured for receiving wave signals from and/or transmitting wave signals to one or more regions $\{R_m\}_{m=1,\ldots,M}$ of interest in an n-dimensional space, with n=2 or 3. An n-dimensional spatial filter function $\hat{\omega}_e(r)$ is determined, which matches projections $\{P_m\}_{m=1,\ldots,M}$ of the one or more regions $\{R_m\}_{m=1,\ldots,M}$ of interest onto an n−1-dimensional sphere centered on the apparatus. Then, a density function $f_b(p)$ is obtained, based on a Fourier transform $\omega(p)$ of the determined spatial filter function $\hat{\omega}_e(r)$. Finally, a position $p_i$ is determined, within said n-dimensional space, for each of N transducers, based on the obtained density function $f_b(p)$ and a prescribed number N of the transducers. The invention is further directed to related devices, apparatuses and systems, as well as computer program products.

13 Claims, 7 Drawing Sheets

(51) Int. Cl.
*H04B 11/00* (2006.01)
*H04R 1/00* (2006.01)
*H04B 7/06* (2006.01)

(56) References Cited

U.S. PATENT DOCUMENTS

| | | | | |
|---|---|---|---|---|
| 5,613,039 | A * | 3/1997 | Wang | G01J 3/453 706/24 |
| 6,067,861 | A * | 5/2000 | Shekarriz | G01F 1/663 367/89 |
| 6,556,916 | B2 * | 4/2003 | Waite | G08G 1/0104 340/933 |
| 8,344,945 | B2 * | 1/2013 | Craig | H01Q 1/288 342/354 |
| 9,537,214 | B2 | 1/2017 | Corman | |
| 2006/0251200 | A1 * | 11/2006 | Miller | G01R 29/26 375/371 |
| 2007/0136012 | A1 * | 6/2007 | Miller | G01R 31/31709 702/67 |
| 2010/0003991 | A1 * | 1/2010 | Pao | H04W 16/18 455/446 |
| 2013/0057432 | A1 | 3/2013 | Rajagopal | |
| 2014/0104107 | A1 * | 4/2014 | Mangenot | H01Q 3/26 342/371 |
| 2016/0050007 | A1 * | 2/2016 | Lee | H04B 7/0456 370/252 |
| 2016/0315391 | A1 | 10/2016 | Bosshard | |
| 2017/0033458 | A1 | 2/2017 | Haziza | |
| 2018/0329009 | A1 * | 11/2018 | James | A61B 5/055 |

OTHER PUBLICATIONS

Paul Hurley et al, Flexibeam: Analytic Spatial Filtering by Beamforming. Acoustics, Speech and Signal Processing (ICASSP), 2016 IEEE International Conference on Mar. 20-25, 2016. pp. 1-4.

Paul Hurley et al, Beamforming towards regions of interest for multi-site mobile networks. International Zurich Semina on Communications (IZS), Mar. 2-4, 2016. pp. 94-98.

Nezihe Merve Guerel, et al., unpublished U.S. Appl. No. 15/480,702, filed Apr. 6, 2017, Determining Positions of Transducers for Receiving and/or Transmitting Wave Signals, pp. 1-42 plus 7 sheets of drawings.

Paul J. Otterstedt, List of IBM Patents or Patent Applications Treated As Related, Jun. 14, 2018, pp. 1-2.

* cited by examiner

DETERMINING POSITIONS OF TRANSDUCERS FOR RECEIVING AND/OR TRANSMITTING WAVE SIGNALS

CROSS-REFERENCE TO RELATED APPLICATIONS

This application is a continuation of U.S. patent application Ser. No. 15/480,702 filed Apr. 6, 2017, the complete disclosure of which is expressly incorporated herein by reference in its entirety for all purposes.

BACKGROUND

The invention relates in general to methods for determining positions of transducers (e.g., antennas) configured for receiving and/or transmitting wave signals, as well as related devices and systems. In particular, it is directed to methods for designing phased-arrays according to a specified, target beamshape. It also relates to beamforming techniques, i.e., methods for beamforming signals or computing beamformed signals, by explicitly targeting designed regions of interest.

Beamforming combines networks of antennas or sensors coherently so as to achieve a beamshape with desirable properties such as high directivity, reduced side-lobes, and improved signal-to-noise ratio (SNR).

Beamforming is often thought of as steering the array to focus on a particular point. This conception, however, has a number of drawbacks. It cannot adjust for small errors in direction of interest estimates, nor cope well with moving devices. Additionally, often a region or regions is what is desired, e.g., to scan the sky in radio astronomy or an organ in ultrasound.

The so-called flexibeam framework [P. Hurley and M. Simeoni, "Beamforming towards regions of interest for multi-site mobile networks," in *International Zurich Seminar on Communications*, 2016, p. 94] was developed to determine, in a data independent fashion, beamforming weights so as to target a general spatial region. The framework takes as input fixed antenna locations, and approximates the target beamshapes.

SUMMARY

According to a first aspect, the present invention is embodied as a method for determining positions $\{p_i\}_{i=1,\ldots,N}$ of transducers $\{A_i\}_{i=1,\ldots,N}$ of an apparatus. The transducers are assumed to be configured for receiving wave signals from and/or transmitting wave signals to one or more regions $\{R_m\}_{m=1,\ldots,M}$ of interest in an n-dimensional space, with n=2 or 3. The method relies on an n-dimensional spatial filter function $\hat{\omega}_e(r)$, which is determined so as to match projections $\{P_m\}_{m=1,\ldots,M}$ of the one or more regions $\{R_m\}_{m=1,\ldots,M}$ of interest onto an n−1-dimensional sphere centered on the apparatus. Then, a density function $f_b(p)$ is obtained, based on a Fourier transform $\omega(p)$ of the determined spatial filter function $\hat{\omega}_e(r)$. Finally, a position $p_i$ is determined, within said n-dimensional space, for each of N transducers, based on the obtained density function $f_b(p)$ and a prescribed number N of the transducers.

According to another aspect, the invention is embodied as a system comprising an apparatus with a set of N transducers $\{A_i\}_{i=1,\ldots,N}$. The transducers are configured, in the apparatus, for receiving wave signals from and/or transmitting wave signals to one or more regions $\{R_m\}_{m=1,\ldots,M}$ of interest in an n-dimensional space, with n=2 or 3. Moreover, and consistently with the above method, the transducers are arranged at positions $\{p_i\}_{i=1,\ldots,N}$ within said n-dimensional space, wherein said positions $\{p_i\}_{i=1,\ldots,N}$ corresponds to arguments of values $\{f_b(p_i)\}_{i=1,\ldots,N}$ of a density function $f_b(P)$ obtained based on the Fourier transform $\omega(p)$ of the n-dimensional spatial filter function $\hat{\omega}_e(r)$. As said above, the latter is determined so as to match projections $\{P_m\}_{m=1,\ldots,M}$ of the one or more regions $\{R_m\}_{m=1,\ldots,M}$ of interest onto the n−1-dimensional sphere, centered on the apparatus.

Finally, and according to a further aspect, the invention can be embodied as a computer program product for determining positions of such transducers. The computer program product comprises a computer readable storage medium having program instructions embodied therewith, wherein the program instructions are executable by a computerized system to cause the latter to implement steps according to the present methods.

Devices, apparatuses, systems, methods and computer program products embodying the present invention will now be described, by way of non-limiting examples, and in reference to the accompanying drawings.

BRIEF DESCRIPTION OF THE DRAWINGS

In FIG. 2A, selected portions are shown as dotted, white doubles arrows on the unit circle, which portions correspond to highest values of projections $P_1$, $P_2$, $P_3$ of respective regions $R_1$, $R_2$, $R_3$ on the unit circle. Regions $R_1$, $R_2$, $R_3$ are located farther away from the center of the circle;

FIG. 2B further shows the resulting beamforming filter $b_N(\theta)$, i.e., a beamshape obtained according to beamforming weights $\omega(p_i)$, which take positions $\{p_i\}_{i=1,\ldots,N}$ of the transducers (antennas) as arguments. These positions have been optimized thanks to a density function $f_b(p)$, based on the Fourier transform $\omega(p)$ of $\hat{\omega}_e(r)$, taking a prescribed number of antennas as input, according to embodiments. The final beamshape $b_N(\theta)$ is very close to the target angular filter;

FIGS. 4-7 show results obtained using: a so-called "sombrero" function; a radial Laplace function; a ball-indicator function; and a bi-dimensional Gaussian function, respectively. The LHS FIGS. (4A, 5A, 6A, 7A) depict, each, the target angular filter $\hat{\omega}(\theta)$ and its spatially extended counterpart $\omega_e(r)$, whereas the RHS FIGS. (4C, 5C, 6C, 7C) show the resulting beamshapes $b_N(\theta)$. The middle FIGS. (4B, 5B, 6B, 7B) show the antenna array layouts $\{p_i\}_{i=1,\ldots,N}$, overlaid on a density plot of the beamforming density function $f_b(P)$;

The accompanying drawings show simplified representations of devices and components (e.g., transducers) thereof, as involved in embodiments. Similar or functionally similar elements in the figures have been allocated the same numeral references, unless otherwise indicated. Density plots represented in the figures have been purposely applied a high contrast, for the sake of depiction.

DETAILED DESCRIPTION

The present Inventors noticed that the existing beamforming techniques, although powerful, gave no hints on where to place the transducers. For instance, The flexibeam framework evoked in the background section takes as input fixed antenna locations to approximate the target beamshapes. Therefore, the Inventors took up the challenge to provide solutions to the problem of transducer positioning. They have accordingly achieved methods for designing transducer layouts based on given, specified target regions, wherein transducer locations are obtained from a probabilistic density function. Such methods are all the more suited for applications to phased-arrays, taking as input a given, target beamshape.

The following description is structured as follows. First, general embodiments and high-level variants are described (sect. 1). The next sections (sect. 2-4) describe specific embodiments, examples of applications, and technical implementation details, respectively.

1. General Embodiments and High-Level Variants

In reference to FIGS. 2-10, an aspect of the invention is first described, which concerns methods for determining positions $\{p_i\}_{i=1,\ldots,N}$ of transducers $\{A_i\}_{i=1,\ldots,N}$ of an apparatus 10, 10$a$.

Generally speaking, the transducers are devices configured for receiving wave signals from and/or transmitting wave signals to one or more regions $\{R_m\}_{m=1,\ldots,M}$ of interest. The devices $\{A_i\}_{i=1,\ldots,N}$ may be receivers, transmitters or transceivers. In all cases, such devices convert a signal in one form of energy to a signal in another form of energy. In particular, the transducers might be bidirectional, e.g., like antennae, which can convert electrical signals to or from propagating electromagnetic waves, and ultrasound coils, which convert electrical signals into/from ultrasounds. In general, the signals received by and/or transmitted from the transducers will be waves, e.g., electromagnetic waves or mechanical waves, like sound waves.

The regions $\{R_m\}_{m=1,\ldots,M}$ are defined in an n-dimensional space (or n-space), where n=2 or 3. Each of the transducers need be positioned in the n-space. That is, the position $p_i$ of each device $\{A_i\}_{i=1,\ldots,N}$ must be determined in $\mathbb{R}^n$, i.e., in the three dimensional space (if n=3) or a plane (if n=2).

Figure 10:
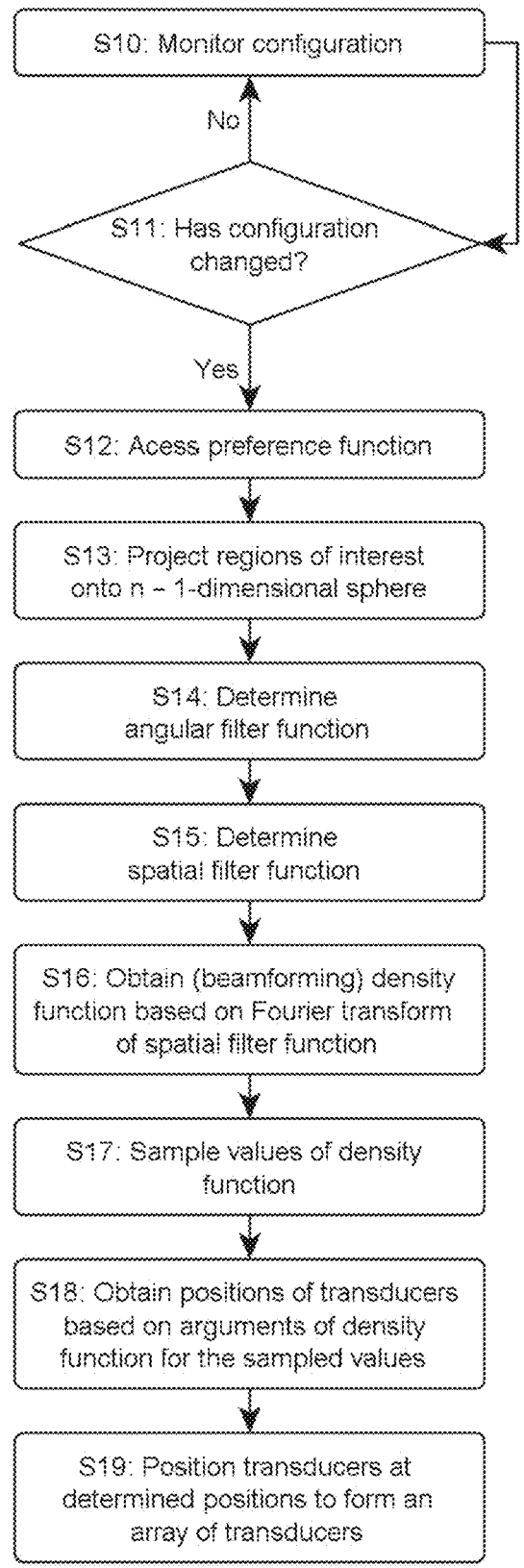
FIG. 10 is a flowchart that illustrates high-level steps of a method for determining positions of transducers of an apparatus, according to embodiments.

To that aim, the present methods first determine an n-dimensional spatial filter function $\hat{\omega}_e(r)$, as, e.g., in steps S12-S15 of FIG. 10. The spatial filter function $\hat{\omega}_e(r)$ (also called spatial filter, or extended filter function in the following) is determined as a function defined in the n-space. This function need to match projections $\{P_m\}_{m=1,\ldots,M}$ of regions $\{R_m\}_{m=1,\ldots,M}$ of interest onto an n−1-dimensional sphere (or n−1-sphere, for short). One assumes there is at least one region of interest for the present purpose.

The n−1-sphere is assumed to be centered on the apparatus 10, 10$a$. For instance, this sphere may, eventually, be centered on the barycenter of the positions $\{p_i\}_{i=1,\ldots,N}$ of the transducers (yet to be determined). The above concepts of n-space, n−1-sphere, regions of interest and projections are discussed below in detail.

Next, a density function $f_b(p)$ is obtained S16, based on a Fourier transform $\omega(p)$ of the previously determined spatial filter function $\hat{\omega}_e(r)$. As it may be realized, the Fourier transform of $\hat{\omega}_e(r)$ may indeed be interpreted as a distribution function, for reason that will become apparent later. The density function $f_b(p)$ may for instance be obtained S16 as a function proportional to the absolute value of the Fourier transform $\omega(p)$ of the S15 spatial filter function $\hat{\omega}_e(r)$. Furthermore, the density function $f_b(p)$ is preferably suitably normalized. Additional mathematical details are given in sect. 2.

Finally, assuming a prescribed number N of transducers, a position $p$, can be determined S17-S18, within the n-space, for each of the N transducers, based on the obtained density function $f_b(p)$, e.g., by suitably sampling the latter. A key point to enable this procedure is to make sure that $\hat{\omega}_e(r)$ is defined in the n-space, i.e., that $\hat{\omega}_e(r)$ take values for r in the n-space, and not in the n−1-space.

Consider for instance an array of N receiving transducers $\{A_i\}_{i=1,\ldots,N}$: application of the present methods allow positions $\{p_i\}_{i=1,\ldots,N}$ of the transducers to be determined, given specified regions of interest, where $\{p_1,\ldots,p_N\} \in \mathbb{R}^n$. When n=3, the positions determined lie in the 3D space, and when n=2, they lie on a plane. That the space the transducers lie in is allowed to vary permits different embodiments, leading to different spatial arrangements of the transducers, depending on the application at hand.

The present methods can advantageously be applied to phased arrays, for which the optimization and design of the layout of the transducers will critically impact the performance. For example, the beamshape of an antenna array depends both on the geometrical (layout) and electrical (gain and phase at each antenna) properties of the array. While the geometrical (layout) properties of the array is usually considered as a fixed input, i.e., a constraint, the present approach makes it possible to design a layout for the transducers according to specified targets, located in regions of interest. Projecting such regions onto the n−1-sphere (centered on the apparatus) allows a spatial filter to be designed and, in turn, a density function to be achieved, from which the positions of each transducer are derived. In fine, an apparatus can be designed and built, whose transducers are arranged according to positions determined thanks to present methods.

During a second phase (i.e., after having determined the positions $\{p_i\}_{i=1,\ldots,N}$ of the transducers), apparatuses designed and built thanks to the present methods may be used for beamforming signals (for transmission purposes) or compute beamformed signals (for reception purposes). Such signals are to be respectively transmitted or received non-uniformly in a 2- or 3-dimensional space, i.e., according to the particular regions of interest. To that aim, delays and gains may suitably be introduced in the signals, by weighting time-series according to beamforming weights $\omega(p_i)$.

That is, the beamforming weights $\omega(p_i)$ are easily be computed thanks to the determined positions and the Fourier transform $\omega(p)$ of $\hat{\omega}_e(r)$, by evaluating $\omega(p)$ for each position $p_i$. Then, delays and gains are introduced, by weighting time-series from or for the devices $\{A_i\}_{i=1,\ldots,N}$, using beamforming weights $\omega(p_i)$. Namely, each time series received from or to be transmitted to a distinct one $A_i$ of the devices is weighted by a beamforming weight $\omega(p_i)$ as determined for said distinct one $A_i$ of the devices.

The core principle remains the same, that signals be transmitted or received. For example, in a transmission case, signals are beamformed by introducing delays and gains as described above, i.e., by weighting time-series which can then be forwarded to respective transmitters (e.g., antennas of a Wifi router), for subsequent transmission to final receivers (e.g., end-users or signals consumers, such as laptops, smartphones, etc.). In reception, signals are sent by initial transmitters (e.g., the same end-users) to receivers (e.g., the same antennas).

Interestingly, the present approach makes it possible to focus on specific regions of interest. Aiming for regions (or areas) rather than points minimizes the required update rate and reduces the requirement for communication. The techniques used herein allow wider ranges of directions to be covered than with matched beamforming techniques. That is, for matched beamforming to cover a same range as with the present approach (all things being otherwise equal), one would have to steer matched beamforming toward many directions within that range. Moreover, and as illustrated in the accompanying drawings, the present solution typically gives rise to less aliasing artifacts (e.g., side-lobes) in the beamshapes.

The present solution can advantageously be used in various applications, including mobile telecommunication networks, Wifi, radio astronomy and ultrasound apparatuses, with, the devices $\{A_i\}_{i=1,\ldots,N}$ being receivers, transmitters or transceivers.

In embodiments, the spatial filter $\hat{\omega}_e(r)$ is obtained based on a preference function (step S12, FIG. 10), which identifies the regions of interest $\{R_m\}_{m=1,\ldots,M}$, in $\mathbb{R}^n$. Such regions can be regarded as preferential regions, from where or to where signals need mostly be sent, e.g., because of a non-uniform distribution, or concentration of the end-users (i.e., the targets and/or the initial transmitters). Accordingly, signals can be sent with higher intensity to or from such regions.

As the regions of interest may evolve, the preference function may change accordingly, thereby triggering a reconfiguration S10-S11, leading to updated beamforming weights $\omega(p_i)$. That is, the system 1, 10, 10a is preferably reconfigurable, i.e., the layout of the transducers may be dynamically changed. In that case, the configuration of the system may be monitored S10-S11. If the configuration of the targets happens to change S11, the updated configuration may be captured in an updated preference function, which gets loaded into the system and new positions can be calculated according to principles discussed above. In variants, even if the system is not reconfigurable, the beamshapes may nevertheless be reconfigured base on the (non-reconfigurable layout of antennas). Obviously, such a system is less performant, though more simple. In all cases, the present methods allow some versatility, compared to prior art approaches.

Having identified S12 one or more regions thanks to the preference function, the regions can then be projected S13 onto the n−1-sphere. This way, an angular filter function, also referred to as "target filter" in this document, can be obtained S14, based on the projections. The angular filter function is denoted by $\omega(\theta)$ in FIGS. 2-7, in which n=2, for simplicity. For applications in the 3D space, the angular filter function may need be defined as $\hat{\omega}(\theta, \varphi)$ or, more generally, as $\hat{\omega}(r)$. The target filter is sometimes noted $\hat{\omega}(\theta, \ldots)$ in the following, to indicate it may take values on a unit circle or a unit sphere.

Note that:
 A 1-sphere is a circle and is the boundary of a disk (also called a 2-ball); and
 A 2-sphere is an ordinary sphere in 3-dimensional Euclidean space, and is the boundary of an ordinary ball.

Projecting one or more regions of interest onto an n−1-sphere gives rise to one or more "surface portions", respectively. Thus, the projections $\{P_m\}_{m=1,\ldots,M}$ correspond to respective "surface portions", where a surface portion is an arc of a circle if n=2 or a surface portion of an ordinary sphere if n=3.

For completeness, projections on an n−1-sphere correspond to n−1-dimensional angles that the regions subtend at the center of the n−1-sphere. Such angles are planar angles when n=2 or solid angles when n=3. The projected regions correspond to projections (or equivalently surface portions) as the set of transducers "see" them from within the n−1-sphere, assuming that this sphere is large enough to contain each of the transducers. However, the actual size of this sphere has little importance, for reasons that will become apparent later. Thus, an n−1-sphere as considered herein is typically a unit sphere (i.e., an object defined in the n−1-space).

The angular filter function $\hat{\omega}(\theta, \ldots)$ can be seen as an optional intermediate between the projections of the regions on the n−1-sphere and the extended filter $\hat{\omega}_e(r)$. The angular filter $\hat{\omega}(\theta, \ldots)$ is constructed based on such projections, so as to reflect values taken by the projections on the n−1-sphere. As per its construction, $\hat{\omega}(0, \ldots)$ is defined on the sole n−1-sphere. Yet, the spatial filter function $\hat{\omega}_e(r)$ can easily be obtained by extending the angular filter function $\omega(\theta, \ldots)$ to $\mathbb{R}^n$.

As a result, $\hat{\omega}_e(r)$ as obtained at step S15 extends (i.e., takes values) in $\mathbb{R}^n$ while the projections are n−1-dimensional objects. That is, the function $\hat{\omega}_e(r)$ "extends" the projections $\{P_m\}_{m=1,\ldots,M}$ over $\mathbb{R}^n$ and, as such, are "thicker" objects, defined in a space of larger dimension than the projections.

Figure 2A:
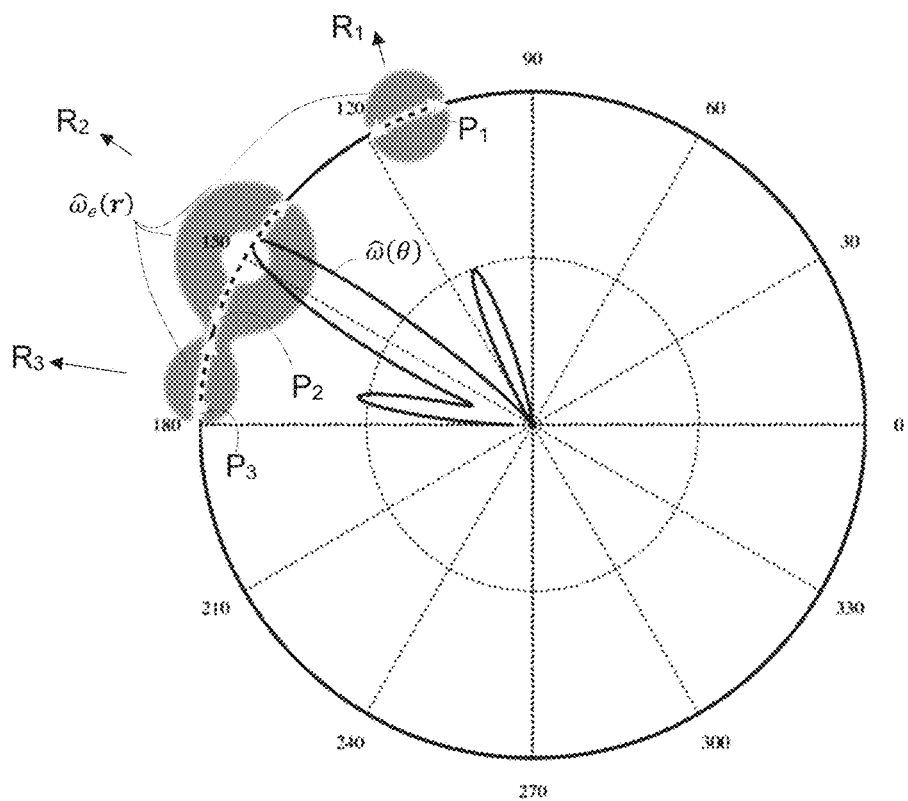
FIGS. 2A-2B depict the same target angular function $\hat{\omega}(\theta)$ on a unit circle, as well as a corresponding spatial filter function $\hat{\omega}_e(r)$, which is a bi-dimensional extension of $\hat{\omega}(\theta)$, as in embodiments. The function $\hat{\omega}_e(r)$ is represented as a density plot, contrasted for the sake of depiction, which shows three main peaks that match $\hat{\omega}(\theta)$ on the unit circle. In more detail.

The spatial filter function $\hat{\omega}_e(r)$ plays an important role. It need be designed so as to match the projections of the regions onto the n−1-sphere, i.e., so as to approximate these projections on the n−1-sphere, it being noted that $\hat{\omega}_e(r)$ is not only defined on this sphere but also in the n-space. For instance, the function $\hat{\omega}_e(r)$ may be constrained to take the same values as the angular filter $\hat{\omega}(\theta, \ldots)$ on the n−1-sphere. The function $\hat{\omega}_e(r)$ will otherwise typically exhibit peaks that coincide with maxima of such projections, on the n−1-sphere. When considering such peaks as objects extending in $\mathbb{R}^n$ (which they are, as opposed to the angular filter that is restricted to the n−1-sphere), then such peaks typically circumscribe or tightly encompass the projections on the n−1-sphere, as seen in FIG. 2A.

In other words, $\hat{\omega}_e(r)$ "extends" the angular function $\hat{\omega}(\theta, \ldots)$ in $\mathbb{R}^n$, notably radially (i.e., perpendicular to the n−1-sphere) and is a "thicker" object than $\hat{\omega}(\theta, \ldots)$. As present inventors have realized, $\hat{\omega}_e(r)$ indeed need be "thicker" than $\hat{\omega}(\theta, \ldots)$ because an object restricted to the sole n−1-sphere (like $(\theta, \ldots)$) would make it impossible to recover a beamforming function or, even, to obtain a meaningful layout for the transducers.

As explained below in detail, one or more peaks of $\hat{\omega}_e(r)$ may be used to match projections of the regions of interest. Here, the terminology "peak" is to be understood broadly: a peak reflects values taken by $\hat{\omega}_e(r)$ in a given portion of the 2- or 3-space, where $\hat{\omega}_e(r)$ takes higher values than around this portion. A peak may even be a 2-dimensionsional rectangular (or boxcar) function, i.e., involve an infinite number of local maxima.

Preferably, $\hat{\omega}_e(r)$ is a L2-function, i.e., it is square-integrable over $\mathbb{R}^n$ and is finite, which implies that $|\hat{\omega}_e(r)| \to 0$ as $|r| \to \infty$. As a L2-function, $\hat{\omega}_e(r)$ suitably behave for it to potentially match projected regions. More preferably, the function $\hat{\omega}_e(r)$ is one that satisfies all Dirichlet conditions, for it to be Fourier transformable. While $\hat{\omega}_e(r)$ may, in some cases, be always positive, $\forall$ r in $\mathbb{R}^n$, it may, in other cases, be chosen to be partly negative. I.e., negativity could be desirable in some cases, for example when using the present methods to expand an incoming signal in a desired basis, whose elements may be negative. More generally, the function $\hat{\omega}_e(r)$ may be complex.

The positions of the transducers are preferably determined S17-S18 by sampling S17 values $\{f_{b,i}\}_{i=1, \ldots, N}$ of the density function $f_b(p)$ obtained at step S16. From the sampled values $\{f_{b,i}\}_{j=1, \ldots, N'}$ one may then identify S18 corresponding arguments $p_i$ corresponding to the sampled values, i.e., such that $f_b(p_i) = f_{b,i} \forall i$. The final positions of the N transducers are then determined based on the identified arguments $\{p_i\}_{i=1, \ldots, N}$. note that the final positions of the N transducers may simply be equated to the identified arguments $\{p_i\}_{i=1, \ldots, N}$. Yet, additional (e.g., design) constraints may need be taken into account, which may lead to small deviation from the ideal positions $\{p_i\}_{i=1, \ldots, N}$.

The geometry of the transducers can for instance be constructed from the quantile function of the density function $f_b(p)$. By appropriately sampling this function, the resulting beamshape will closely resemble the target.

Preferably, the spatial filter function $\hat{\omega}_e(r)$ is determined S15 as a function having a defined, analytical Fourier transform, such that the density function $f_b(p)$ can next be obtained S16 based on this analytical Fourier transform. E.g., the spatial filter function $\hat{\omega}_e(r)$ may be constructed based on known, well-defined analytical functions, for which analytical Fourier transforms are known, such that no explicit Fourier transformation need be involved. Thus, the function $\omega(p)$ can be obtained based on readily available, analytical Fourier transforms. All the more, no numerical Fourier transformation is involved in that case, which avoids numerical instabilities as typically caused by numerical transforms. In less preferred variants though, the present methods may also be implemented thanks to numerical transforms.

Using filter functions that have defined, analytical Fourier transforms allows a procedure that is numerically stable, computationally efficient and flexible, which, in turn, offers analysts a powerful tool for designing beamshapes in a much more controlled manner. That the transducers layout is optimized allows the quality of the subsequent beamshapes to be substantially improved. In that respect, and as seen in FIGS. 4-7, layouts as obtained thanks to embodiments of this invention may lead to beamshapes never obtained before and never thought obtainable.

Depending on the complexity desired for the spatial filter function $\hat{\omega}_e(r)$, one or more auxiliary functions may be involved in its construction, where each auxiliary function has a defined, analytical Fourier transform. Namely, in embodiments, the function $\hat{\omega}_e(r)$ is determined S15 as a sum of auxiliary functions that have, each, a defined, analytical Fourier transform. In that case, the density function $f_b(p)$ is obtained S16 based on a sum of analytical Fourier transforms that correspond, each, to a respective one of the auxiliary functions.

Using a sum of auxiliary functions makes it possible to closely fit a variety of target functions, even functions having cusps or edges. The spatial filter function $\hat{\omega}_e(r)$ may for instance be determined as a sum of Gaussian functions. This is advantageous as contractions of even a few Gaussians can be used to fit a wide range of target functions, including functions having cusps, and, this, to a reasonable approximation. Furthermore, Gaussian functions allow for an easy representation in each of the direct space and the transformed space. A Gaussian function that is localized in one space, will be diffuse in the transformed space. However, as the transform of a Gaussian is still a Gaussian, the transformed function is still well-behaved; this not only eases the transforms but also avoids spurious effects when computing the weight coefficients and simplifies the computation of such coefficients. In other words, well-behaved coefficients can be obtained, which lead to clean beams.

In variants, ball indicator functions may be used. Other examples of functions can be contemplated, as discussed in sect. 2. The auxiliary functions used need not form a complete basis. On the contrary, a combination of different types of functions may possibly be used (in a weighted sum of such functions). E.g., one may simultaneously use ball indicator functions, Gaussian functions, Slater functions, etc., where some of the Gaussian/Slater functions may, if necessary, be parameterized so as to approach a Dirac distributions. This, in turn, allow more complex filters to be approximated.

In still other variants, however, one may rely on auxiliary functions, which do not satisfy Dirichlet conditions, but which locally behave well, e.g., take the same (or almost the same) values as known, transformable functions. The function $\hat{\omega}_e(r)$ may for instance be written as a weighted (finite) sum of sine and/or cosine functions, fitting to a target angular filter $\hat{\omega}(\theta)$, see explanations below, on the n−1-sphere, while the transform of $\hat{\omega}_e(r)$ is taken as an integral over a finite domain (which again yields analytical formula). More generally, the one skilled in the art will appreciate that many types of auxiliary functions may be contemplated.

Figure 3:
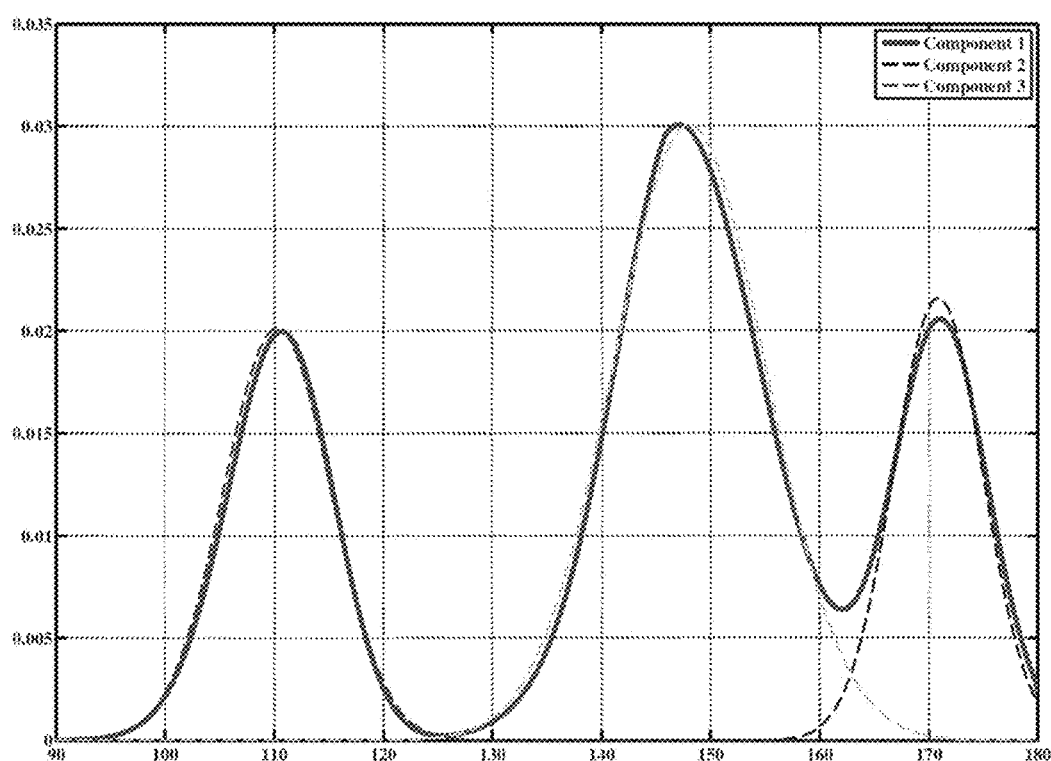
FIG. 3 depicts the angular filter $\hat{\omega}(\theta)$ otherwise unwrapped, where it is plotted over the interval $[\pi/2; \pi]$. As further seen in FIG. 3, the angular filter $\hat{\omega}(\theta)$ can be approximated as a combination of functions (here Gaussians) and so does the corresponding spatial filter $\hat{\omega}_e(r)$ (not shown in this figure), in embodiments.

The auxiliary functions used to construct $\hat{\omega}_e(r)$ may further be extrapolated from the auxiliary functions used to construct the target angular filter, as illustrated in FIG. 3. This point is discussed in more detail in sect. 2.

Where $\hat{\omega}_e(r)$ is taken as a sum of auxiliary functions, the density function $f_b(p)$ is preferably obtained as the absolute value of the sum of the sum of the Fourier transforms of each individual auxiliary function, for reasons that will become apparent in sect. 2.

In simple embodiments, M auxiliary functions are used, which corresponds to the number of regions $\{R_m\}_{m=1,\ldots,M}$ of interest. I.e., the auxiliary functions are chosen so as to match projections $\{P_m\}_{m=1,\ldots,M}$ of the regions $\{R_m\}_{m=1,\ldots,M}$ onto the n−1-sphere, as illustrated in FIG. 2A.

More generally, $\hat{\omega}_e(r)$ may be devised so as to exhibit, on the n−1-sphere, maxima that match the maxima of the projections $\{P_m\}_{m=1,\ldots,M}$, so as to suitably reflect the angular distribution of the regions $\{R_m\}_{m=1,\ldots,M}$ onto the n−1-sphere. Now, and depending on the auxiliary functions used, $\hat{\omega}_e(r)$ may have more (or less) local maxima than the projections $\{P_m\}_{m=1,\ldots,M}$ of the regions on the n−1-sphere.

In simple cases, the angular filter $\hat{\omega}(\theta, \ldots)$ may take on the value 1 on certain "arcs", i.e., portions of the n−1-sphere (corresponding to projected regions), and 0 outside, e.g., if regions are initially identified in a binary way rather than with a density map. In such cases too, the auxiliary functions may be suitably chosen so as for $\hat{\omega}_e(r)$ to faithfully reflect the angular filter on the n−1-sphere. For instance, the spatial filter $\hat{\omega}_e(r)$ may, in that case, be designed so as to have, on a circle (n=2) or on a sphere (n=3), one or more maxima (or a constant value) within each of the one or more arcs or surface portions corresponding to the projections $\{P_m\}_{m=1,\ldots,M}$ of the regions of interest.

Figure 1:
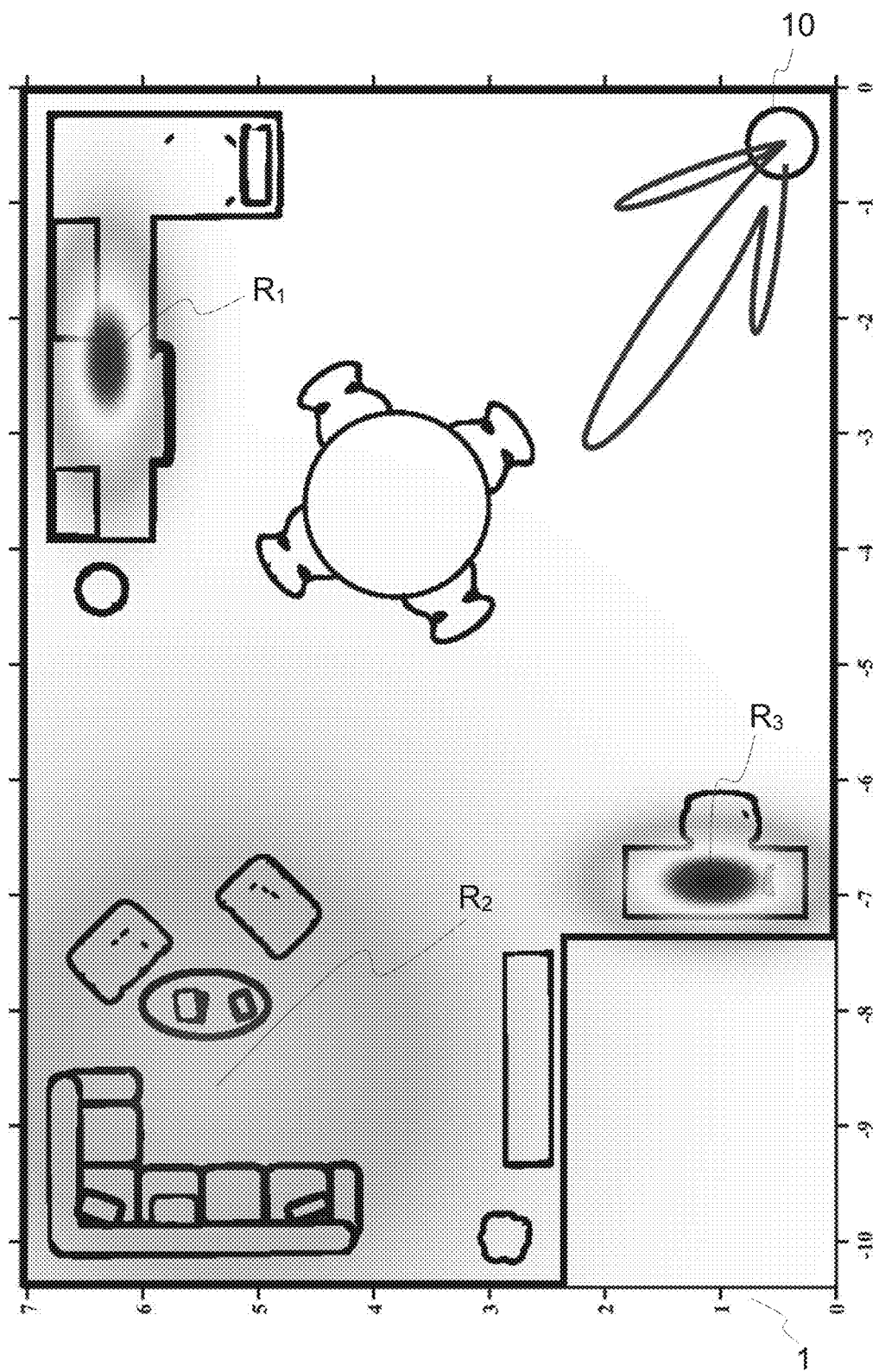
FIG. 1 represents a plan of a living room overlaid with a preference function, which identifies regions of interest (desk $R_1$, sofa $R_2$ and kitchen $R_3$) in the living room as a density plot. Darker regions represent regions of higher interest, where users most often need to receive and transmit signal. A router (circle) is located at the upper-right corner; a plot is overlaid that schematically represents a target angular filter function $\hat{\omega}(\theta)$, suited for covering the regions of interests, as involved in embodiments.
Figure 8:
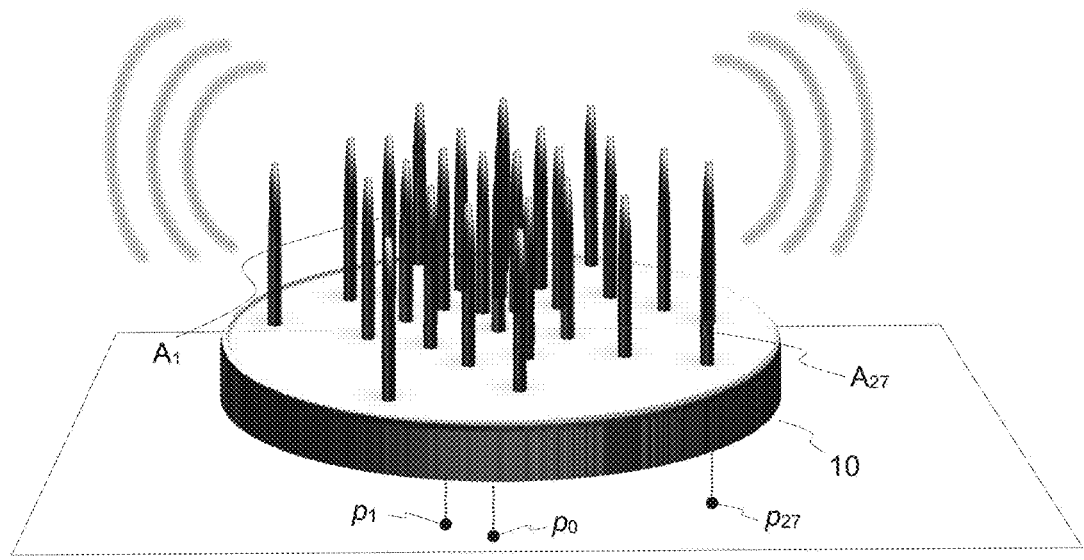
FIG. 8 is a 3D view of a router, comprising 27 antennas, arranged in the router according to a layout obtained according to embodiments.
Figure 9:
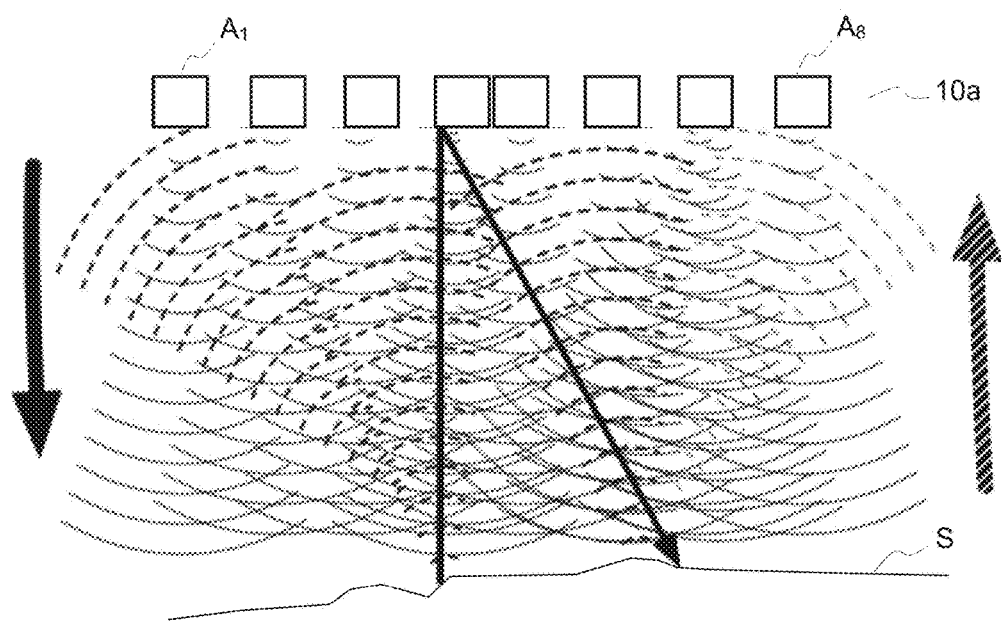
FIG. 9 schematically represents an array of ultrasound transducers, arranged according to a layout obtained according to embodiments, and transmitting original sound waves (plain lines) and receiving waves (dashed lines) reflected by a sample.

Referring now more specifically to FIGS. 1, 8 and 9: according to another aspect, the invention can be embodied as a system 1 comprising an apparatus 10, 10*a* such as depicted in FIGS. 8 and 9. This apparatus comprises a set of N transducers $\{A_i\}_{i=1,\ldots,N}$, which are configured, in the apparatus 10, 10*a*, for receiving wave signals from and/or transmitting wave signals to one or more regions of interest in the n-space (with, again, n=2 or 3).

In addition, the transducers are arranged at specific positions $\{p_i\}_{i=1,\ldots,N}$, i.e., as obtained thanks to the present methods. For example, the positions of the transducers may correspond to arguments of values of the density function $f_b(p)$, the latter obtained based on the Fourier transform $\omega(p)$ of $\omega_e(r)$, as described above. The resulting layout is atypical, as seen in FIGS. 4C to 7C. It may, at first sight, evoke a random distribution and clearly departs from usual layouts of transducers, which are typically arranged according to a regular array, having given symmetries.

As evoked earlier, the system 1 is optionally reconfigurable. To that aim, the transducers may be movably mounted in the apparatus 10, 10*a*, or, at least, the transducers are re-positionable (as typically is the case during fabrication). A reconfigurable system need be suitably equipped (with movable parts, stages, etc.) for (re-)positioning the transducers according to positions determined based on given targets.

The present systems will typically comprise computerized modules, configured to perform the following tasks (one or more modules may be involved, having one or more functions each):

First, such modules need be designed to determine a spatial filter function, so as for the latter to match projections of the regions of interest onto the n−1-sphere (centered on the apparatus 10, 10*a*). To that aim, the modules may rely on a preference function, compute the angular filter and, based on it, determine a suitable extended filter. Additional modules may possibly monitor the configuration, and trigger a recomputation of $\hat{\omega}_e(r)$ when the configuration changes.

Second, the modules will be adapted to determine the density function $f_b(p)$, by Fourier transforming the previously determined spatial filter function, as explained earlier. In fact, where analytical Fourier transforms are available, such modules will simply compute $f_b(p)$ based on the known analytical transforms; and Third, the modules need be configured to determine positions of the transducers, based on the density function $f_b(p)$, e.g., by suitably sampling the latter.

In addition, the present systems may comprise:

A digital beamforming module, configured for computing a beamformed signal, based on a summation of time-series received by receivers (or transceivers); and/or An analog beamforming module, configured for beamforming signals, by weighting time-series to be transmitted by transmitters (or transceivers). In this case, the beamforming module can indeed be regarded as an analog module, inasmuch as delays and gains are introduced in the signals to be transmitted, via the weighting scheme.

Such a system may notably be embodied as: a transmitter apparatus; a receiver; a transceiver (e.g., a wireless access point such as a Wifi router, as in FIG. 8; a mobile telecommunication network, comprising one or more of the aforementioned apparatuses; a large phased array of antenna; or, still, as an ultrasonic sensing system, such as depicted in FIG. 9.

The system may comprises more than one set of transducers, the sets possibly including receivers, transmitters and/or transceivers, which may possibly form distinct modules, located in distinct regions of space. The transducers of at least one of these sets will be arranged at specific positions $\{p_i\}_{i=1,\ldots,N}$, i.e., as obtained thanks to the present methods. One or more of these sets of transducers may form "targets", i.e., be located in said regions of interest (and yet forming part of the system), whereas another one of the set may comprise transducers arranged at said specific positions $\{p_i\}_{i=1,\ldots,N}$, so as to efficiently transmit signals to the targets.

The above embodiments have been succinctly described in reference to the accompanying drawings and may accommodate a number of variants. Several combinations of the above features may be contemplated. Examples are given in the next section.

2. Specific Embodiments—Implementation Details

This section describes a method that is useful for designing phased-arrays according to a given, analytically-specified, target beamshape. Building on the flexibeam framework, antenna locations are sampled from a probabilistic density function. Naturally scalable with the number of antennas, it is also computationally efficient and numerically stable, as it relies on analytical derivation.

It is further shown that, under mild conditions, the achieved beamshapes converge uniformly to the target beamshapes as the number of antennas increases. The technique is illustrated through a number of examples. For instance, by use of the Laplace filter, beams with extremely fast decay away from the center of focus are achieved.

The procedure is numerically stable, computationally efficient and versatile, offering the analyst a very powerful tool for designing beamshapes, as well as insight into how an array will scale with ever increasing numbers of antennas. Matched beamforming weights may, for a given layout, achieve beamshapes targeting regions, rather than isolated directions as commonly believed.

As the beamforming weights all have unit modulus, this translates into a delay, allowing existing hardware to be used to achieve a given beam, and has the advantage of treating noise uniformly across antennas. In contrast, prior approaches like the so-called "flexibeam" technique modify the magnitude of the weights at the cost of non-uniform noise distribution.

Additionally, the convergence analysis can be used to forecast the growth of future, large phased arrays such as the Square Kilometre Array (SKA).

For simplicity in explanation, this description merely considers circularly symmetric filters and 2D beamforming. Extension to 3D beamforming readily follows.

2.1 Preliminaries 2.1.1 Beamforming

Consider an array of N receiving antennas, which, without loss of generality, have unit gains and an omni-directional field of view. In mathematical terms, "beamforming" translates into a linear combination of the antenna signals $x_i(t)$:

$$y(t) = \sum_{i=1}^{N} w_i^* x_i(t), \quad (1)$$

where $\omega_i \in \mathbb{C}$ are beamforming coefficients.

Under the non-limiting assumptions of far-field and narrowband signals, $$y(t) = \int_0^{2\pi} s(t,\theta) b^*(\theta) d\theta + \sum_{i=1}^{N} w_i^* n_i(t). \quad (2)$$

The function $b(\theta)$ is called the beamshape of the beamformed antenna array and is defined as:

$$b(\theta) = \sum_{i=1}^{N} \omega_i e^{j2\pi p_i \cos(\theta - \phi_i)}.$$

It describes the sensitivity of the antenna array relative to various directions $\theta$, and hence acts as an angular filter.

2.1.2 Beamforming with Flexibeam

The so-called flexibeam framework (see also P. Hurley and M. Simeoni, "Flexibeam: analytic spatial filtering by beamforming," in *International Conference on Acoustics, Speech and Signal Processing (ICASSP), IEEE*, March 2016) permits to achieve a wide range of analytically-specified beamshapes. In this section, some important notions and notations borrowed from this framework are briefly recalled.

One innovation of Flexibeam was to consider a notional continuous field of antennas, with an associated beamforming function $\omega: \mathbb{R}^2 \to \mathbb{C}$, describing the gains and delays to be applied at each location $(p,\varphi) \in (p,\phi) \in \mathbb{R}_+ \times [0,2\pi]$ so as to achieve an analytically specified target beamshape $\hat{\omega}: [0,2\pi\mathbb{C}] \to \mathbb{C}$:

$$\hat{\omega}(\theta) = \int_0^\infty \int_0^{2\pi} \omega(p,\phi) e^{j2\pi p \cos(\theta-\phi)} p \, d\phi \, dp. \quad (3)$$

The beamforming function can be computed as $$\omega(p,\phi) = \int_0^\infty \int_0^{2\pi} \hat{\omega}_e(r,\theta) e^{-j2\pi rp \cos(\theta-\phi)} r \, d\theta \, dr \quad (4)$$

where $\hat{\omega}_e: \mathbb{R}^2 \to \mathbb{C}$ is the extended filter introduced in the previous section, which can be constrained such that $\hat{\omega}_e(1,\theta) = \hat{\omega}(\theta)$. For N given antenna locations, the corresponding beamforming weights are then obtained by sampling $\omega$:

$$w_i = \frac{\omega(p_i, \phi_i)}{\beta}, \quad i = 1, \ldots N,$$

where $\beta$ is a normalizing constant to avoid noise magnification. The resulting beamshape then approximates the target beamshape, with accuracy dependent on the specific layout under consideration.

2.2 "Flexarray"

In this section, a new framework is proposed, termed "flexarray", to generate random layouts so as to approximate analytically-specified target beamshapes. To do so, we leverage the flexibeam framework and construct a probability density function from the beamforming function. In the specific case of circularly symmetric extended filters, we link this density function to the Hankel transform of order zero of the extended filter. We finally show that the empirical beamshapes obtained when sampling this density converge uniformly almost surely to the target beamshape as the number of antennas grows to infinity.

2.2.1 Beamforming with Circularly Symmetric Extended Filters

This section is concerned with extended filters that are real and, when translated to the origin, circularly symmetric, namely:

$$\hat{\omega}_e(r) = \hat{g}(\|r - r_0\|), \forall r \in \mathbb{R}^2,$$

where $\hat{g}$ is a function defined over $\mathbb{R}_+$, and $r_0 = (\cos \theta_0, \sin \theta_0) \in \mathbb{S}^1$ is the focus direction. Eq. (4) shows that the beamforming function is the 2D Fourier transform of the target filter. Leveraging the shift property of Fourier transforms, we can hence express the beamforming function in terms of the zeroth order Hankel transform of $\hat{g}$:

$$\omega(p,\phi) = e^{-j2\pi p \cos(\phi-\theta_0)} \int_0^\infty \int_0^{2\pi} r\hat{g}(r) e^{-j2\pi rp \cos(\theta-\phi)} d\theta \, dr \quad (5)$$
$$= e^{-j2\pi p \cos(\phi-\theta_0)} \left[ 2\pi \int_0^\infty r\hat{g}(r) J_0(2\pi rp) dr \right]$$
$$= e^{-j2\pi p \cos(\phi-\theta_0)} g(p),$$

where $J_0$ is the zeroth order Bessel function of the first kind. Then, $$g(p) = 2\pi \int_0^\infty r\hat{g}(r) J_0(2\pi rp) dr, \quad (6)$$

is the Hankel transform of order zero of $\hat{g}$.

2.2.2 Beamforming in a Probabilistic Setup $\mathcal{L}$

Assuming that the beamforming function is such that $\omega \in \mathcal{L}_1(\mathbb{R}^2)$, its relationship to the target beamshape from Eq. (4) can be re-written using Eq. (5), as $$\hat{\omega}(\theta) = \int_0^\infty \int_0^{2\pi} [e^{-j2\pi p \cos(\phi-\theta_0)} g(p)] e^{j2\pi p \cos(\theta-\phi)} p \, d\phi \, dp \quad (7)$$
$$= \int_0^\infty \int_0^{2\pi} \|g\|_1 \sigma_g(p) e^{-j2\pi p \cos(\phi-\theta_0)} \ldots$$
$$e^{j2\pi p \cos(\theta-\phi)} f_b(p,\phi) p \, d\phi \, dp,$$

where:

$$\|g\|_1 = \int_0^\infty |g(p)| dp$$

and $$\sigma_g(p) = \text{sign}(g(p))$$

Now, $f_b$ can be interpreted as a probability density function, corresponding to the beamforming density function introduced in sect. 1, which in polar coordinates is defined as $$f_b(p, \phi) = \frac{|g(p)|}{\|g\|_1}, \forall p \in \mathbb{R}_+. \quad (8)$$

Let P: $\Omega \to \mathbb{R}^2$ be a random vector with polar coordinates (P, $\Phi$) and probability density function $f_b$, see eq. (8). The angular filter function is then $$\hat{\omega}(r) = \alpha \mathbb{E}_{P}[\sigma_{-}(\|P\|) e^{-j2\pi \langle r_0, P \rangle} e^{j2\pi \langle r, P \rangle}], \forall r \in \mathbb{S}^1, \quad (9)$$

with $\alpha = \|g\|_1$, $r_0 = (\cos\theta_0, \sin\theta_0)$ and $\langle .,. \rangle$ the Cartesian inner product. An expression for the extended filter $\hat{\omega}_e$ follows directly by extending Eq. (9) to $\mathbb{R}^2$, that is, $$\hat{\omega}_e(r) = \alpha \mathbb{E}_{P}[\sigma_{-}(\|P\|) e^{-j2\pi \langle r_0, P \rangle} e^{j2\pi \langle r, P \rangle}], \forall r \in \mathbb{R}^2. \quad (10)$$

Notice that when $\alpha = 1$ and $g \geq 0$, this can be seen as the Fourier transform of the density function $f_b$, modulated by an exponential term $e^{-j2\pi \langle r_0, P \rangle}$. Leveraging the shifting property of the Fourier transform, we finally get $$\hat{\omega}_e(r + r_0) = \mathbb{E}_P[e^{j2\pi \langle r, P \rangle}] := \varphi_P(r), \forall r \in \mathbb{R}^2,$$

which is the characteristic function of the random vector P.

In conclusion, in the specific case where $\alpha = 1$ and $g \geq 0$, the extended filter $\hat{\omega}_e$ can be seen as the characteristic function of the random vector P, centered on $r_0$, the steering direction. Similarly, the target beamshape $\omega$ can be seen as the characteristic function of the random vector P, centered on $r_0$, and evaluated on the unit circle.

2.2.3 Empirical Beamshapes and Asymptotic Convergence

Assume that for a target beamshape $\hat{\omega}$, with circularly symmetric extended filter $\hat{\omega}_e$, we computed the density beamforming function $f_b$ as described in Section 2.2.2, and sampled N independent polar coordinates from this density $$\{(p_i, \phi_i)\}_{i=1,\ldots,N} \stackrel{i.i.d.}{\sim} f_b.$$

If we place antennas at these locations, and impose beamforming weights $\omega_i$ for each antenna, the resulting array will have a beamshape given by $$b_N(\theta) = \sum_{i=1}^{N} w_i e^{j2\pi p_i \cos(\theta - \phi_i)}, \forall \theta \in [0, 2\pi].$$

Choosing the beamforming weights as $$w_i = \frac{\alpha}{N} \sigma_g(p_i) e^{-j2\pi p_i \cos(\phi_i - \theta_0)}, i = 1, \ldots, N, \quad (11)$$

leads to the empirical beamshape, finite-sample version of Eq. (9):

$$b_N(\theta) = \frac{\alpha}{N} \sum_{i=1}^{N} \sigma_g(p_i) e^{-j2\pi p_i \cos(\phi_i - \theta_0)} e^{j2\pi p_i \cos(\theta - \phi_i)}.$$

Notice that when $\sigma_g = 1$, the beamforming weights in Eq. (11) are simply matched beamforming weights, which steer the beamshape around $\theta_0$. The empirical beamshape is an unbiased estimate of the target beamshape $\hat{\omega}$. Moreover, depending on the function g, this estimate can also be shown to be consistent. This follows from the uniform strong law of large numbers.

The resulting empirical beamshape writes as $$b_N(\theta) = \frac{1}{N} \sum_{i=1}^{N} \psi(P_i, \theta),$$

where $$\psi(P_i, \theta) := \alpha \sigma_g(p_i) e^{-j2\pi p_i \cos(\phi_i - \theta_0)} e^{j2\pi p_i \cos(\theta - \phi_i)}.$$

Then, if the function $\psi(\psi, \theta)$ is continuous and measurable for all $\theta \in [0, 2\pi]$:

$$\sup_{\theta \in [0, 2\pi]} \|b_N(\theta) - \hat{\omega}(\theta)\|_2 \xrightarrow{a.s.} 0$$

as the number of antennas N grows to infinity.

A study of the function $\psi$, reveals that a sufficient condition for $b_N$ to be a consistent estimate of $\hat{\omega}$ is for the function g to be either strictly positive or strictly negative. For functions g that switch signs, we can still use the classical strong law of large numbers to show point-wise convergence. The empirical beamshapes for the Laplace, Sombrero and Gaussian functions, investigated in sections 2.3 and 2.4, converge extremely quickly, approximately as 1/N.

2.3 Examples of Layout Distributions

We first discuss the traditional case, targeting one individual point, before the case of targeting whole regions. Following the framework, for a given target $\hat{\omega}(\theta)$, we need to design an extended filter $\hat{\omega}_e(r, \theta)$ defined on the whole plane, and determine an appropriate distribution $f_b$ for achieving the target. The derived beamforming density functions are a consequence of known Hankel transform pairs.

2.3.1 Focusing on a Single Point

To target a single direction $\theta_0$, a simple example of filter would be $\hat{\omega}_e(r, \theta) = \delta(\theta - \theta_0)\delta(r - 1)$. The resulting beamforming function is $$\omega(p, \phi) = e^{j2\pi p \cos(\theta_0 - \phi)}.$$

Yet, as one may realize, such a function has unbounded support, and thus no beamforming density function exists. In practice, we may instead sample over a finite disc, which is effectively achieved by an array that targets matched beamforming.

2.3.1.1 Sombrero Function

Consider the so-called Sombrero function, $$\hat{g}(r) = \sigma \frac{J_1\left(2\pi \frac{r}{\sigma}\right)}{r},$$

where $\sigma > 0$. The beamforming density function is then, up to rescaling, a uniform distribution over the disc of radius $1/\sigma$:

$$f_b(p, \phi) \propto \begin{cases} 1 & \text{if } p \leq 1/\sigma \\ 0 & \text{otherwise} \end{cases}.$$

From this we can conclude that for matched beamforming, a uniformly distributed array across a given area will get us close to the Sombrero function, which as the array diameter increases, converges to a Dirac.

2.3.1.2. Radial Laplace

Instead of trying to approximate a Dirac, it may be wiser to target a better behaved function, with an explicit control on the beamshape, which decays around the focus point $\theta_0$. This can be achieved by the radial Laplace function: $\hat{g}(r)=e^{-\sigma}$ where $\sigma>0$. The beamforming density function is then, up to a rescaling function, $$f_b(p,\phi) \propto \frac{1}{(1+4\pi^2\sigma^2 p^2)^{\frac{3}{2}}}.$$

Figure 4A:
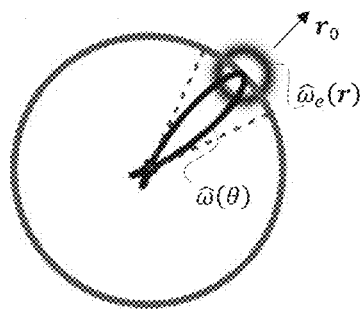
FIGS. 4A-4C, 5A-5C, 6A-6C, and 7A-7C (collectively FIGS. 4-7) show examples of beamshapes $b_N(\theta)$, and transducer layouts $\{p_i\}_{i=1,\ldots,N}$ as obtained from associated density function $f_b(p)$, using various intermediate (basis) functions to obtain a spatial filter $\hat{\omega}_e(r)$ that, in this example, has a single focus direction $r_0$. The angular filter $\omega(\theta)$ is determined based on the circular sector enclosed by two (dotted) radii.
Figure 4B:
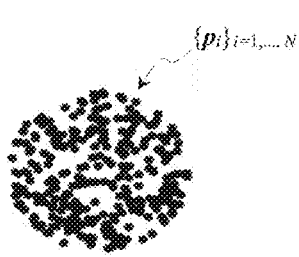
Figure 4C:
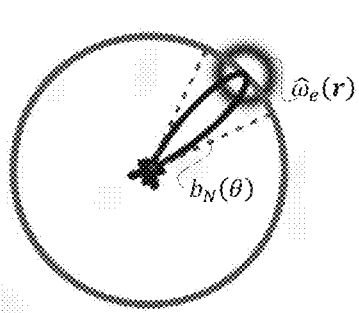
Figure 5A:
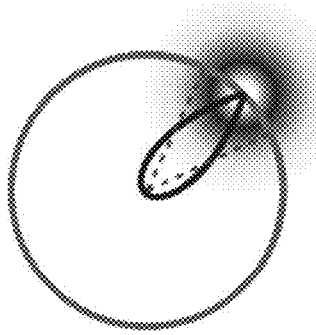
Figure 5B:
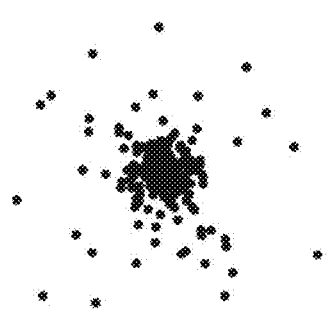
Figure 5C:
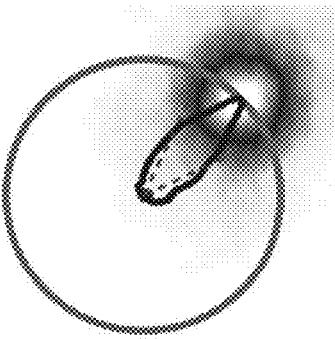

Example Sombrero and radial Laplace beamshapes are shown in FIGS. 4 and 5. The Laplace beamshape has almost no sidelobes, with its energy focused around the point of interest.

2.4 Targeting Regions

We now present the beamforming density functions associated to the ball indicator function and the circularly symmetric Gaussian function.

2.4.1. Ball Indicator

Consider the following disc of radius R:

$$\hat{g}(r) = \begin{cases} 1, & r \leq R \\ 0, & \text{otherwise} \end{cases}.$$

The beamforming density function is then, up to a rescaling function, $$f_b(p,\phi) \propto \frac{|J_1(2\pi Rp)|}{p}.$$

It is interesting to note that, due to the Hankel pair relationship, approximating a region with the ball achieves a Sombrero beamforming density, while approximating a Sombrero requires a uniform density in a disc.

2.4.2. Bi-dimensional Gaussian

An alternative way to cover a region is to use a bi-dimensional Gaussian filter:

$$\hat{g}(r) = \frac{1}{2\pi\sigma^2}e^{-\frac{r^2}{2\sigma^2}},$$

where $\sigma>0$. The beamforming density function is then given by, up to a rescaling function $$f_b(p,\phi) \propto e^{-2\pi^2\sigma^2 p^2}.$$

Figure 6A:
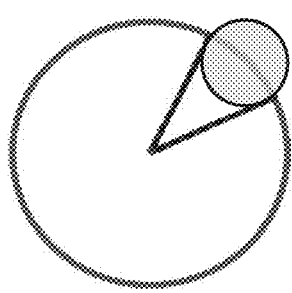
Figure 6B:
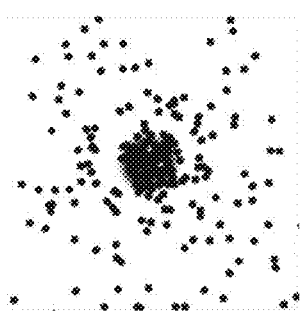
Figure 6C:
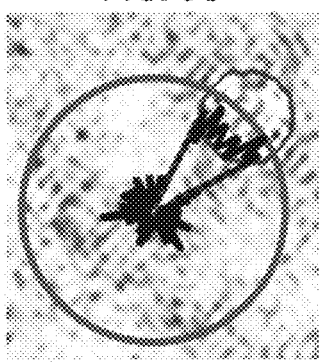
Figure 7A:
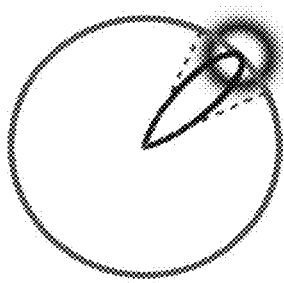
Figure 7B:
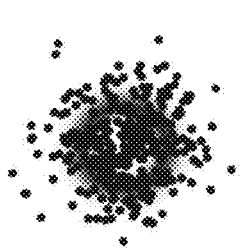
Figure 7C:
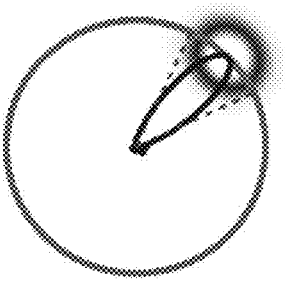

Example ball indicator and Gaussian beamshapes are shown in FIGS. 6 and 7. The discontinuity of the ball indicator function breaks the requirements for the convergence of the empirical beamshape (as defined above) to be applicable. Hence, the beamshape demonstrates a significant side-lobe structure, also known as the Gibbs phenomenon. In contrast, the Gaussian is very smooth but does not isolate the portion of interest as well.

3. Examples of Applications 3.1 Wifi

We now describe an embodiment for the transmission and receipt of data using a Wifi router. To simplify, but without limiting the scope of the invention, we assume the router and all the devices broadcasting in the room lie on a plane, e.g., the plane of FIG. 1.

A Wifi router with multiple antennas, carefully positioned, is used for transmission. As input a preference function $f$: $\mathbb{R}^3 \rightarrow \mathbb{R}$ is accessed, which identify regions of interest. To that aim, any pattern described a desired irradiation may be used, e.g., a density map. In variants, the preference function accessed may already be in the form of an angular function. I.e., the preference function may be the angular filter $\hat{\omega}(r)$ itself.

For example, function $f$ can indicate how each location in a living room should be irradiated by the router's signal based on user's preferences. In variants, the preference function may be automatically learned, using newer Wifi standards (802.11n, 802.11ac), whereby preferences (or average positions) may be automatically learned from instant locations of devices (either passively detected or with help of explicit status communication).

Consider for example a room as in FIG. 1 (approximately 10.5×7 m). The Wifi router 10 is located in the upper right corner. The darker regions of the overlaid density plot correspond to locations where users are most likely to use their electronic devices, and hence where they need good power coverage from the router.

Based on the preference function accessed, an optimal layout is obtained and, subsequently, an optimal beamshape is achieved, which covers well the preferential areas, while compensating for signal attenuation when travelling in the area of interest.

Preferred embodiments would approximate the preference function in terms of Gaussian functions, so as to enable analytical calculation of the beamforming function.

Note that most embodiments evoked herein assume the devices to lie in the far field. Indeed, no beamforming would be necessary if the devices were in the near field. This assumption is believed to hold for all reasonable modes of operation. For example for a frequency of operation of $f_0=2.4$ GHz (as typical for Wifi signals), and for a single antenna of length l=15 cm, every device located at a distance from the antenna greater than $d_0=2l^2/\lambda \approx 3.6$ mm can be considered as lying in the far field.

An example of The Wifi router 10 is depicted in FIG. 8, which is composed of 27 antennas and has a radius of 25 cm. The positions $\{p_1, \ldots, p_{27}\} \in \mathbb{R}^2$ of the individual antennas $\{A_1, \ldots, A_{27}\}$ are restricted to $\mathbb{R}^2$ for simplicity and the center of the router is denoted by $p_0 \in \mathbb{R}^2$. Said positions are determined according to principles described earlier. In FIG. 8, a few antennas positions are explicitly spotted, i.e., the projections of a few antenna positions are represented on a plane parallel to the average plane of the router 10, the average plane assumed to coincide with the plane of interest.

Figure 2B:
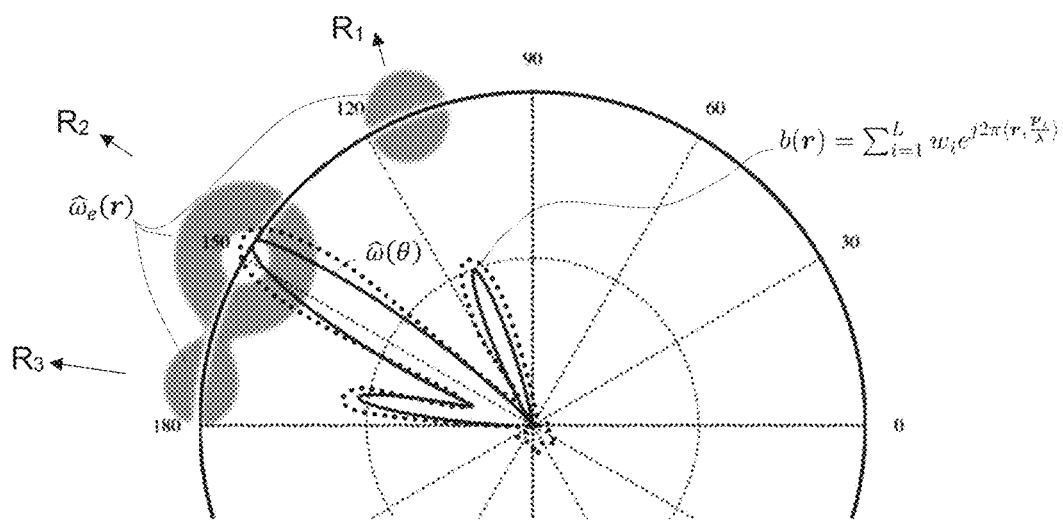

An example radial filter $\hat{\omega}(\theta)$ is shown in FIGS. 2A and 2B. It is unwrapped in FIG. 3 and plotted over the interval $[\pi/2, \pi]$, by seeing it as a function of $\theta \in [-\pi, \pi]$, i.e., the polar coordinate of the vector r on the circle. To facilitate the design of such a filter, we may approximate it as a contraction of three Gaussian functions (as otherwise depicted in FIG. 3). The maxima of $\hat{\omega}(\theta)$ typically correspond to maxima of the projections on the unit circle. More generally, all the parameters involved may be refined for $\hat{\omega}(\theta)$ to fit the projections.

We can compute the beamforming function ω(p) by taking the (well-defined) Fourier transform of $\hat{\omega}_e(r)$. The function $\hat{\omega}_e$ is designed so as to extrapolate $\hat{\omega}$ to the plane assuming one has, radially, essentially the same characteristic extension as tangentially. Yet, other approaches would convene as well, provided that the extended filter $\hat{\omega}_e$ is "thicker" than $\hat{\omega}$. As a general rule though, $\hat{\omega}_e$ may suitably extend $\hat{\omega}$ radially by assuming the radial deviation equal to the tangential deviation. Note that in the above example, $\hat{\omega}_e$ is not exactly equal to $\hat{\omega}$ on the circle. In variants, one may, however, constrain it to take exactly the same values as $\hat{\omega}$ on the circle, while giving it a given thickness on each side of the circle, as in the case of the ball indicator function.

In general, a characteristic radial extension of $\hat{\omega}_e$ will delimit a circular region with radius less than 1 (i.e., think of a ball indicator function of radius less than 1, the value of unit-circle radius). However, in exceptional cases (large regions), the characteristic radial extension of $\hat{\omega}_e$ may delimit a circular region with radius larger than 1, but always less than 2 (i.e., the critical radius for which the entire unit-circle would be contained in the extension. Hence, larger radii (although theoretically conceivable) would not provide any substantial benefit. For example, when using the ball indicator function, a radius of 2 or greater would always lead to the same beamshape, filtering uniformly across all possible directions.

$$b(r) = \frac{1}{\beta} \sum_{i=1}^{L} \omega\left(\frac{p_i}{\lambda}\right) e^{j2\pi(r, \frac{p_i}{\lambda})},$$

Assuming L antennas in the router. β is the normalization factor, i.e., $$\beta = \Sigma_{i=1}^{L} |\omega(p_i/\lambda)|^2,$$

to avoid noise magnification due to beamforming. Because the beamshape as defined above is an aliased version of the target angular filter, small side-lobes may result in the radiation pattern (see FIGS. 4-7). Yet, thanks to antenna layouts as obtained in embodiments, such lobes will remain small, if not negligible, and the resultant radiation pattern will cover well the regions of interest.

3.2 Mobile Phone

Here we briefly describe embodiments for beamforming using a collection of 3G/4G (or in the future 5G) transmitters. The goal is to determine what beamshape should be used at each transmitter. For a given transmitter of a set, a preferred embodiment is as follows:

Compute the angular filter by taking the radial projection of the preference function, which amounts to circular cuts of the global density function defined over the whole region;
Approximate this angular filter by a sum of weighted Gaussian functions, see, e.g., FIG. 3;
Extend this filter to the plane, using a technique as described earlier, and compute its Fourier transform analytically, to obtain the density function $f_b$;
Sample positions of antennas composing the transmitter and position the antennas at the determined positions (note that the position of the transmitters too may be optimized); and
Compute the weights to be applied to each antenna composing the transmitter by sampling the Fourier transform.

For example, one may wish to beamform so as to cover optimally a part of a city, based on a priori knowledge of the probable positions of clients.

The beamshapes obtained according to the above procedure approximate very well the associated angular filter. With this technique, the network's users will have a better signal's reception, as less power is dissipated in unnecessary areas of the city. This is a huge advantage compared to current technologies in use, where broadcasting is isotropic and independent from the device distribution.

3.3 Ultrasound

Ultrasound consists of transmit beamforming (beamforming to target the ultrasound output at a certain point) and receive beamforming (beamforming the resultant echoes). Two concurrent operations are thus needed, one of the transmit and one of the receive type. The transmitted and received signals are linked in that case because the echoes are shaped by the transmit beamforming.

Ultrasound phased arrays are often 1D (with all transducers aligned on a single axis, as assumed in FIG. 9), generating 2D images. More recently, 2D arrays of transducers have been proposed, which generate 3D images. In all cases, application of the present invention can be made to improve the transducer layouts.

The potential benefits of present embodiments for ultrasound include:
Faster generation of images;
More accurate images;
Resolution can more carefully be adjusted;
Easier design of systems for 3D imaging;
More accurate videos (due to faster update potential); and
A lower number of transducers is necessary, enabling low-cost and portable devices.

The general (known) method for transmit beamforming consists of inducing delays (a delay law) between the pulses emitted by each of the transducers. The goal is to achieve a narrow focus a certain distance away for a desired angle. This is equivalent to performing a focused beamforming for a given angle each time. The echoes from the resultant beam are then received by each transducer. They are then combined by a weighted sum to produce a single image, using the receive beam. The final image can be obtained by scanning across many angles. In this mode of operation, the whole image is desired, and focused beamforming is just a means to obtain it. Each sweep has high SNR at the point of focus, and reduced SNR around it, with side-lobes also distorting the resultant image.

Embodiments of the invention modify this known method by allowing for variation in the delays and magnitudes at each transducer, thus inducing phase and magnitude changes in the resultant beamforming.

3.4 Radio Astronomy

Modern radio telescope correlate the signals measured by thousands of antennas at various location on the ground, in order to infer an image of the sky. To reduce the amount of data sent to the central processor and increase the signal to noise ratio, the antennas are grouped together in stations and beamformed via matched beamforming. As we have seen previously, matched beamforming maximizes the power coming from one direction in the sky, but sees little about the rest of the sky. Hence, surveying large portions of the sky with matched beamforming requires multiple observations, where matched beamforming is steered towards various locations on the sky in order to cover a whole portion of interest. This is suboptimal and time consuming, and one would benefit much more from a beamshape which could capture the power of the signals coming from a wider range of directions.

Thus, an example of application to radio astronomy, for a given collection of antennas that have a modifiable layout, is:

A desired spatial filter is given on a unit sphere.
This desired spatial filter is extended to the 3D space.
An optimal layout of antennas is derived and the antennas are correspondingly located; and
The subsequent beamforming function is obtained, which is sampled at the optimized locations of the antennas to obtain the weights.

These weights are then applied to beamform at each time-instance.

4. Technical Implementation Details 4.2 Computerized Units and Apparatuses

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present invention can be implemented wherein general-purpose digital computers, such as personal computers, workstations, etc., are used.

Figure 11:
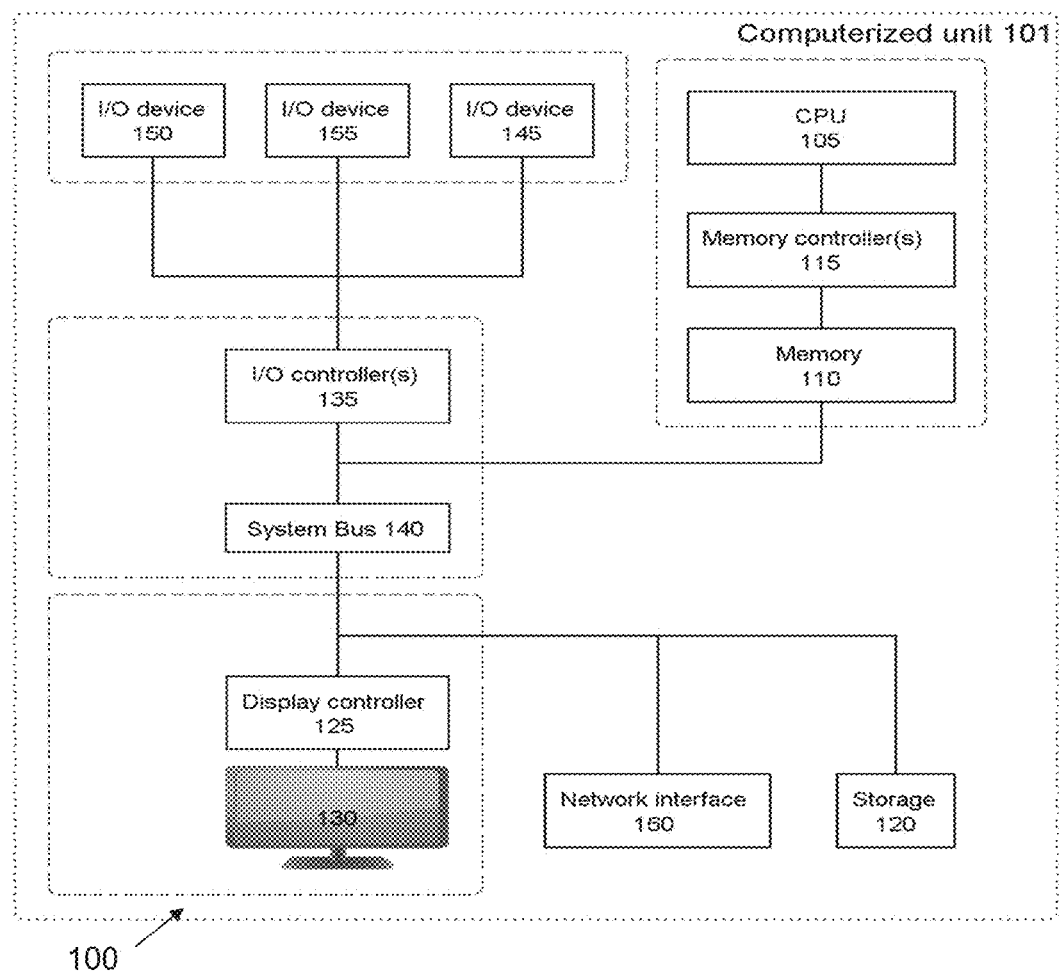
FIG. 11 shows a computerized system suited for implementing one or more method steps as in embodiments of the invention.

For instance, the system 100 depicted in FIG. 11 schematically represents a computerized unit 101, e.g., a general- or specific-purpose computer, which may be used as part of any of the apparatuses 10, 10 or systems 1 described earlier. As such, the unit 101 may interact with receivers, transmitters and/or transceivers, e.g., via converters and I/O units 145-155.

In exemplary embodiments, in terms of hardware architecture, as shown in FIG. 11, the unit 101 includes a processor 105, memory 110 coupled to a memory controller 115. One or more input and/or output (I/O) devices 145, 150, 155 (or peripherals) are communicatively coupled via a local input/output controller 135. The input/output controller 135 can be or include, but is not limited to, one or more buses and a system bus 140, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 11, the software in the memory 110 includes methods described herein in accordance with exemplary embodiments and, in particular, a suitable operating system (OS) 111. The OS 111 essentially controls the execution of other computer programs and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

Possibly, a conventional keyboard and mouse can be coupled to the input/output controller 135. Other I/O devices 140-155 may include or be connected to other hardware devices 10, as noted earlier.

In addition, the I/O devices 140-155 may further include or be connected to devices 10 that communicate both inputs and outputs. The system 100 can further include a display controller 125 coupled to a display 130. In exemplary embodiments, the system 100 can further include a network interface or transceiver 160 for coupling to a network 165, to enable, in turn, data communication to/from other, external components.

The network 165 transmits and receives data between the unit 101 and external systems. The network 165 is possibly implemented in a wireless fashion, e.g., using wireless protocols and technologies, such as Wifi, WiMax, etc. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 165 can also be an IP-based network for communication between the unit 101 and any external server, client and the like via a broadband connection. In exemplary embodiments, network 165 can be a managed IP network administered by a service provider. Besides, the network 165 can be a packet-switched network such as a LAN, WAN, Internet network, etc.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS 111, in whole or in part are read by the processor 105, typically buffered within the processor 105, and then executed. When the methods described herein are implemented in software, the methods can be stored on any computer readable medium, such as storage 120, for use by or in connection with any computer related system or method.

4.2 Computer Program Product

The present invention may be an apparatus, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, other applications than those explicitly mentioned may benefit from beamforming methods as described herein.

What is claimed is:

1. A method for determining positions $\{p_i\}_{i=1,\ldots,N}$ of transducers $\{A_i\}_{i=1,\ldots,N}$ of an apparatus, the transducers configured for receiving wave signals from and/or transmitting wave signals to one or more regions $\{R_m\}_{m=1,\ldots,M}$ of interest in an n-dimensional space, with n=2 or 3, the method comprising:
   determining a n-dimensional spatial filter function $\hat{\omega}_e(r)$, which matches projections $\{P_m\}_{m=1,\ldots,M}$ of the one or more regions $\{R_m\}_{m=1,\ldots,M}$ of interest onto an n−1-dimensional sphere centered on the apparatus;
   obtaining a density function $f_b(p)$, based on a Fourier transform $\omega(p)$ of the determined spatial filter function $\hat{\omega}_e(r)$;
   determining, within said n-dimensional space, a position $p_i$ for each of N transducers, based on the obtained density function $f_b(p)$ and a prescribed number N of the transducers.

2. The method according to claim 1, wherein determining the position $p_i$ of each of the N transducers comprises:
   sampling values $f_b(p_i)$ of the obtained density function $f_b(p)$, to obtain sampled values; and
   identifying arguments $p_i$ corresponding to sampled values, the position $p_i$ of each of the N transducers determined based on the identified arguments $p_i$.

3. The method according to claim 1, wherein:
   the spatial filter function $\hat{\omega}_e(r)$ is determined as a function having a defined, analytical Fourier transform; and
   the density function $f_b(p)$ is obtained based on said analytical Fourier transform.

4. The method according to claim 3, wherein the density function $f_b(p)$ is obtained as a function proportional to an absolute value of the Fourier transform $\omega(p)$ of the determined spatial filter function $\hat{\omega}_e(r)$.

5. The method according to claim 3, wherein:
   the spatial filter function $\hat{\omega}_e(r)$ is determined as a sum of functions having, each, a defined, analytical Fourier transform; and
   the density function $f_b(p)$ is obtained based on a sum of analytical Fourier transforms corresponding, each, to a respective one of the functions of said sum of functions.

6. The method according to claim 5, wherein the spatial filter function $\hat{\omega}_e(r)$ is determined as a sum of Gaussian functions.

7. The method according to claim 5, wherein the spatial filter function $\hat{\omega}_e(r)$ is determined as a sum of ball indicator functions.

8. The method according to claim 1, wherein the method further comprises, prior to determining the spatial filter function:
   accessing a preference function, which identifies said one or more regions $\{R_m\}_{m=1,\ldots,M}$ of interest in the n-dimensional space.

9. The method according to claim 1, wherein determining the spatial filter function $\hat{\omega}_e(r)$ further comprises:
   projecting said one or more regions of interest onto said n−1-dimensional sphere to obtain said projections $\{P_m\}_{m=1,\ldots,M}$; and
   determining an angular filter function $\hat{\omega}(r)$, defined on said n−1-dimensional sphere, based on the obtained projections $\{P_m\}_{m=1,\ldots,M}$,
and wherein
   said spatial filter function $\hat{\omega}_e(r)$ is determined based on the determined angular filter function $\hat{\omega}(r)$.

10. The method according to claim 9, wherein, at determining said spatial filter function, said spatial filter function $\hat{\omega}_e(r)$ is determined so as to exhibit, on the n−1-dimensional sphere, maxima that respectively match maxima of the projections $\{P_m\}_{m=1,\ldots,M}$.

11. The method according to claim 10, wherein, at determining said spatial filter function $\hat{\omega}_e(r)$, the spatial filter function $\hat{\omega}_e(r)$ is constrained to take, on the n−1-dimensional sphere, the same values as the determined angular filter function $\hat{\omega}(r)$.

12. The method according to claim 9, wherein said spatial filter function $\hat{\omega}_e(r)$ is determined so as to be defined for any r in the n-dimensional space and be square-integrable over the n-dimensional space.

13. The method according to claim 12, wherein said spatial filter function $\hat{\omega}_e(r)$ is a continuous, positive function, for any r in the n-dimensional space.

* * * * *